P. GRIFFIN.
Assignor, by direct and mesne assignments, of five-sixths to J. F. LEAHY, E. CALLAHAN, J. HACKETT, J. L. MAHER, and J. M. GRIFFIN.
ROADWAY.
No. 11,088. Reissued June 17, 1890.
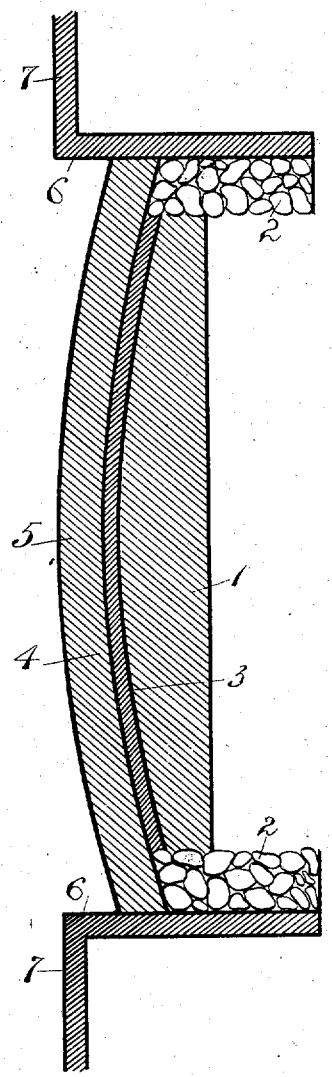
Witnesses,
T. W. Johnson
C. A. Bartlett
Inventor:
P. Griffin
By Wallace A. Bartlett
Atty

UNITED STATES PATENT OFFICE.

PATRICK GRIFFIN, OF UTICA, NEW YORK, ASSIGNOR, BY DIRECT AND MESNE ASSIGNMENTS, OF FIVE-SIXTHS TO JAMES F. LEAHY, EDWARD CALLAHAN, JOHN HACKETT, JOHN L. MAHER, AND JOHN M. GRIFFIN, ALL OF SAME PLACE.

ROADWAY.

SPECIFICATION forming part of Reissued Letters Patent No. 11,088, dated June 17, 1890.

Original No. 382,153, dated May 1, 1888. Application for reissue filed December 12, 1889. Serial No. 333,551.

*To all whom it may concern:*

Be it known that I, PATRICK GRIFFIN, of Utica, in the county of Oneida and State of New York, have invented certain new and useful Improvements in Roadways; and I do hereby declare the following to be a full, clear, and exact description of the invention, that will enable others skilled in the art to which it appertains to make and use the same, reference being had to the accompanying drawing, and to the figures of reference marked thereon, which form a part of this specification.

My invention relates to an improvement in paving streets and roads.

The object of my invention is to form a compact and dry earth foundation in laying asphalt or similar pavement.

The figure shows a cross-section of a road or street paved in conformity with my improved method.

In the drawing, 1 represents the depth of the excavation, which may be varied, and 2 2 represent the drains filled with stone.

In order to enable others skilled in the art to pave roads and streets by my plan, I will now proceed and describe the various steps employed.

I first remove the earth from the road-bed by excavation to the depth of from six to eighteen inches, depending upon the character of pavement required. I then bring the bottom of the excavation to substantially an even surface, when the same is preferably saturated with water and compressed by passing a heavy roller over the surface. I then provide drains on each side of the road-bed, which are filled with stone, in order to take out the surplus water from the road-bed and thus prevent the road heaving by frost. I replace or refill the excavation with earth put on in layers, saturated with water, and thoroughly compressed by rolling. This is repeated until the desired convex contour of the road-bed 3 is formed. The whole mass of earth replaced in the excavation is thoroughly compressed in layers by the means heretofore referred to. Over the surface of compressed earth, compressed into suitable shape, I preferably place a covering of felt. (Represented in the drawing in cross-section, at 4.) This felt, however, may be omitted entirely, or any other substantially water-proof material may be used in place of felt. Over the covering of the compressed road-bed I provide and place a coat of grouting composed of cement, sand, or gravel in plastic condition, or the compressed road-bed may be covered with a coating of coal-tar, sand, and gravel, applied in a plastic condition, so that when the same hardens a complete water-tight layer is formed, as indicated at 5 in the drawing, whereby a solid compact pavement or driveway is formed, free from the tendency in cold climates to heave and otherwise crack the coating or layer 5 of the pavement.

By sinking the blind drain on either side of the roadway, as shown at 2 2, the water is prevented from interfering with the compressed foundation of the road-bed.

In the drawing, 6 6 represent the curbing, and 7 7 the sidewalk, and in constructing a road on my improved plan I preferably curb the outer wall of the ditches below the cement with boards or plank, to more effectually shut out the water.

It is quite obvious here that the order of performing the various steps in the operation is unimportant, so long as the several steps are taken to compress the earth, remove the surplus water by the blind drain, and cover the compressed earth forming the road-bed with a water-tight wearing-surface, substantially as set forth.

What I claim as new, and desire to secure by Letters Patent, is—

1. A roadway consisting of successive layers of compressed earth, clay, or the like, covered with a layer of felt, having a depressed ditch filled with loose stones at each side, and the whole covered with a layer of water-proof wearing material.

2. A roadway consisting of successive layers of compressed and compacted clayey material, having side drains, and the whole covered with a water-tight wearing-surface resting directly on the compacted clay, substantially as described.

In testimony whereof I affix my signature in presence of two witnesses.

PATRICK GRIFFIN.

Witnesses:

PHILIP MAURO,

W. A. BARTLETT.